Dec. 27, 1932.  F. G. WITHROW  1,891,966
REAR VIEW MIRROR BRACKET
Filed Jan. 22, 1929
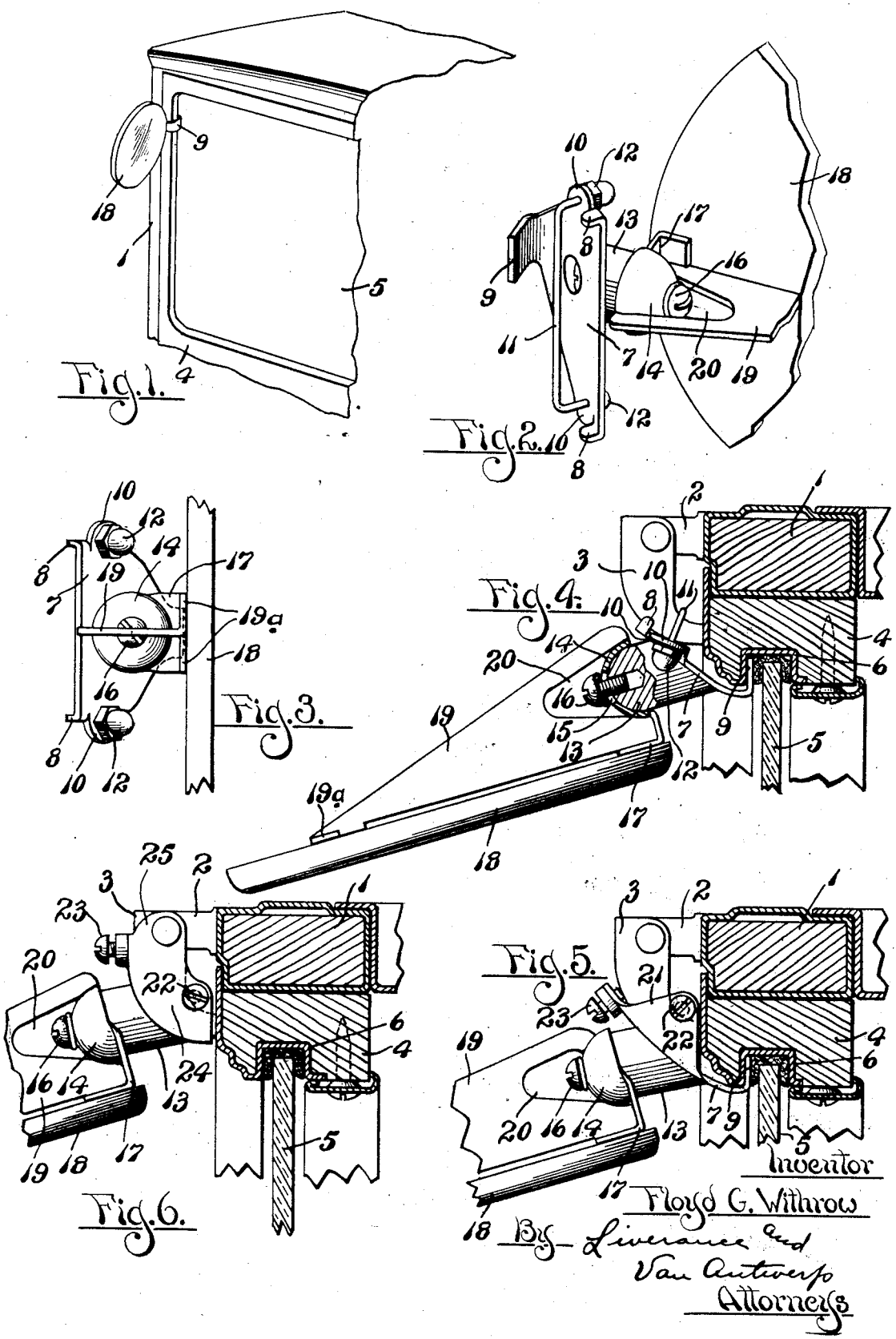

Patented Dec. 27, 1932

1,891,966

UNITED STATES PATENT OFFICE

FLOYD G. WITHROW, OF GRAND RAPIDS, MICHIGAN

REAR VIEW MIRROR BRACKET

Application filed January 22, 1929. Serial No. 334,232.

This invention relates to a rear vision mirror of the type used on motor vehicles, and is particularly concerned with a novel bracket support for a rear vision mirror and a novel method of mounting the same on closed car bodies whereby the mirror is mounted on one of the front doors of the body to swing therewith and is located at the outer side of the door, being readily adjustable to different positions from inside of the body on lowering the front door window adjacent the mirror. The mirror support is one which is of simple and economical construction, readily manufactured at low cost and very quickly and easily installed in place on the motor vehicle body.

The invention may be understood from the following description of embodiments thereof shown in the accompanying drawing, in which, Fig. 1 is a fragmentary perspective view illustrating the mirror mounted on a front door of a motor vehicle.

Fig. 2 is a fragmentary perspective view from the back side of the mirror illustrating the bracket construction used and the manner in which the mirror is attached thereto.

Fig. 3 is an edge elevation of a fragmentary portion of the mirror and showing the supporting means therefor in elevation.

Fig. 4 is an enlarged partial plan view and horizontal section of the construction in Fig. 2 mounted on an automobile door.

Fig. 5 is a fragmentary view similar to Fig. 4 showing a different form of construction of the bracket support, and Fig. 6 is a similar view showing a still further form of construction of supporting bracket.

Like reference characters refer to like parts in the different figures of the drawing.

The automobile body on which the mirror is to be mounted includes the usual front frame members 1 between which the windshield is located and from which one of the members 2 of the hinges for the front door projects outwardly, the other hinge member 3 being secured to the door 4 and having a hinged connection to the hinge member 2, whereby the door may swing outwardly about the vertical axis of the hinge pin used. The door has the usual glass 5, which may be raised and lowered in the usual manner, being guided in felt guides seated in a channel guide 6, which is located vertically at the inner side of the door frame, this being well known and conventional construction.

The bracket which carries the mirror includes a metal plate 7, wider at one end than at the other, and which at its wider end is formed with two laterally turned ears 8, at opposed edges of the plate 7 which are adapted, when the bracket is attached in place, to pass one above and the other below the hinge member 3. At the opposite and narrower end of the plate 7 it is turned to form a hook 9 adapted to seat in the channel guide 6. The bracket 7 also has two outwardly extending ears 10 located immediately adjacent the laterally turned ears 8, associated with which is a U-shaped rod 11, the legs of which pass through the ears 10 and receive nuts 12 on their end portions, which are threaded, whereby the U-shaped rod 11 may be passed around the hinge member 3, as shown in Fig. 4, thereby serving to secure the bracket to the hinge member with the hook 9 located in the channel 6, as previously described.

From a side of the plate 7 a post 13, having a rounded substantially spherical outer end, extends at an angle to the plane of the plate 7, being permanently secured thereto in any suitable manner.

A cup shaped bracket 14 is placed over the rounded outer end of the post 13, having a slot 15 therein, as shown, through which a screw 16 passes to thread into the end of the post 13. The bracket 14 is extended to one side and formed into an attaching foot 17 which is permanently secured to the back side of a mirror 18 near one edge thereof. A reinforcing brace 19 of metal is connected at its outer end permanently to the back of the mirror 18, having laterally turned feet 19a soldered or otherwise permanently secured to the mirror back, while at its inner end it is formed with a deep recess or notch 20, so as not to interfere with the head of the screw 16, and engaging with the mirror bracket at opposite sides of the cup shaped member 14 being permanently secured to the bracket by soldering or other equivalent means.

The post 13, when the bracket 7 is attached to the automobile door, as shown in Fig. 4, extends outwardly and the mirror may be adjusted properly to a desired position, there being a substantially universal movement of the mirror bracket about the end of the post 13. The mirror may be quickly secured to the door and the door hinge 3 and is readily positioned so as to properly reflect for the driver to observe what is behind the vehicle. And the mirror may be changed in position if necessary by the driver from inside the automobile body, it being necessary only to lower the glass 5 to reach the mirror. The mirror swings outwardly when the door is opened and moves back to operative position when the door is closed. The bracing member 19 attached, as described, serves to hold the mirror against any vibration.

In Fig. 5 a slightly different form of bracket for attachment to the body is used, in which the bracket 7 is formed with upper and lower laterally bent ears 21, much larger in size than the ears 8, which extend above and below the hinge member 3 far enough that a bolt or screw may be passed downwardly through the free end portions of said ears and at the inner side of the hinge member 3. The same hook member 9 engages with the channel guide 6 and at the opposite end a screw 23 is threaded through the bracket to bear against the outer side of the hinge member 3 for the purpose of tightening the bracket upon the hinge member, as is evident.

In Fig. 6 a still different form is shown, in which the bracket is of a form to cover the upper, lower and outer sides of the hinge member 3, said upper and lower sides 24 practically covering the hinge member. The hook 9 is eliminated and this bracket is secured to the hinge member by extending the upper and lower sides to form ears 25 through which the hinge pin of the hinge may pass, while bolt 22 passes at the inner side of the hinge member 3; and the screw 23 located at the same end of the bracket, as shown in Fig. 5, bears against the outer side of the hinge member and may be tightened to bring the bracket in very snug engagement therewith. In all cases the post 13 for immediately supporting the mirror extends outwardly from the bracket which is attached to the hinge of the door.

The construction described is one easy of manufacture, it may be made at a low cost and the attachment thereof to the door is very simple and easy. It has heretofore been almost universal that the rear vision mirrors are mounted inside of automobiles having enclosed bodies and the vision to the rear is restricted by the rear window in the body. With the construction which I have devised the mirror is located outside of the body, the vision to the rear is not restricted and the driver of a vehicle equipped with a mirror as disclosed in my invention, is able to see motor vehicles approaching from the rear and also as they pass by to the left. The construction described permits a very practical and ready mounting of rear vision mirrors on closed bodies of automobiles at the outside of the body, the mirror swinging with the door and not interfering in any way with its movements. The invention is defined in the appended claims and is to be considered comprehensive of all forms of structure coming within the scope thereof.

I claim:

1. In combination with a body for a motor vehicle having a door, hinge members connected to the door, complementary hinge members connected to the body, said hinge members on the door and body being pivotally connected together, of a supporting bracket detachably and securely connected to the movable hinge member of one of the hinges of said door at a point spaced from the pivotal connection of the said hinge member, and a rear vision mirror adjustably mounted on said bracket and extending outwardly with respect to the door, said mirror being movable with the door when it is swung in opening or closing the door.

2. In a construction of the class described, a sheet metal bracket having upper and lower sides connected by a web, whereby said bracket is adapted to be applied to a hinge member, said upper and lower sides of the bracket adapted to lie on opposite sides of the hinge member and extending inwardly beyond the inner side of said hinge member to which it is applied, connecting means adapted to extend back of said hinge member through said upper and lower sides of the bracket, a post extending outwardly from said bracket and a rear vision mirror adjustably mounted on said post.

3. In combination with a door having a groove and a hinge for said door having a hinge member fixed to the door, a bracket engageable with the outer surface of one of said hinge members, a hook on said bracket inserted in said groove in the door, means for fastening said bracket to said hinge member and a mirror mounted on said bracket.

4. In combination with a door having a groove and a hinge for said door having a hinge member fixed to the door, a bracket engageable with the outer surface of said hinge member, means associated with said bracket and engageable with the inner surface of said hinge member, a hook on said bracket inserted into said groove in the door and a mirror mounted on said bracket.

5. A signal support for automobiles comprising a member secured to the hinge of an automobile door and a retaining plate secured to said member and also to the door.

In testimony whereof I affix my signature.
FLOYD G. WITHROW.